(12) United States Patent
Ebrahimi Afrouzi et al.

(10) Patent No.: US 10,518,576 B1
(45) Date of Patent: Dec. 31, 2019

(54) EXPANDABLE WHEEL

(71) Applicants: Ali Ebrahimi Afrouzi, San Jose, CA (US); Shahin Fathi Djalali, San Francisco, CA (US)

(72) Inventors: Ali Ebrahimi Afrouzi, San Jose, CA (US); Shahin Fathi Djalali, San Francisco, CA (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 15/444,966

(22) Filed: Feb. 28, 2017

Related U.S. Application Data

(60) Provisional application No. 62/302,920, filed on Mar. 3, 2016, provisional application No. 62/342,987, filed on May 29, 2016.

(51) Int. Cl.
*B60B 19/04* (2006.01)
*B60B 19/12* (2006.01)
*B60B 19/00* (2006.01)

(52) U.S. Cl.
CPC .......... *B60B 19/04* (2013.01); *B60B 19/003* (2013.01); *B60B 19/12* (2013.01); *B60B 2900/351* (2013.01)

(58) Field of Classification Search
CPC ....... B60B 19/003; B60B 19/04; B60B 19/12; B60B 19/125; B60C 17/044
See application file for complete search history.

(56) References Cited

U.S. PATENT DOCUMENTS

| | | |
|---|---|---|
| 1,371,980 A | 3/1921 | Ramsey |
| 1,435,042 A | 11/1922 | Zottoli |
| 1,450,626 A | 4/1923 | Atwood |
| 1,469,393 A | 10/1923 | O'Connor |
| 1,890,872 A | 12/1932 | Van Kleeck |
| 2,610,898 A | 9/1952 | Smith |
| 2,916,331 A | 12/1959 | Gardner |
| 2,924,486 A | 2/1960 | Blaschke |
| 3,672,458 A | 6/1972 | Mackerle |
| 3,995,909 A | 12/1976 | Van Der Lely |
| 4,335,899 A * | 6/1982 | Hiscock ............... B60B 3/082 280/259 |
| 4,420,192 A | 12/1983 | Holchuk |
| 4,601,519 A | 7/1986 | D'Andrade |
| 4,643,696 A | 2/1987 | Law |
| 4,648,853 A | 3/1987 | Siegfried |
| 4,773,889 A | 9/1988 | Rosenwinkel |
| 1,408,885 A | 3/1992 | Humphery |
| 5,487,692 A | 1/1996 | Mowrer |

(Continued)

*Primary Examiner* — Kip T Kotter

(57) ABSTRACT

An expandable wheel has rollers arranged radially about a plate within a main housing. Spokes pivotally connected to the plate are attached to linkages on which the rollers are mounted. The rollers and linkages protrude through apertures in the main housing. The rollers form the circumference of the wheel. Rotation of the plate relative to the main housing changes the angle of the spokes relative to radii of the plate. When the spokes are parallel with the radii of the plate, the rollers are pushed radially outward at a maximum distance from the plate, forming the largest wheel circumference. When the spokes are as near perpendicular as possible with respect to the radii of the plate, the rollers are pulled radially inward at a minimum distance from the plate, forming the smallest wheel circumference.

8 Claims, 11 Drawing Sheets

(56) References Cited

U.S. PATENT DOCUMENTS

| | | | |
|---|---|---|---|
| 5,492,390 A | 2/1996 | Kugelmann, Sr. | |
| 5,690,375 A * | 11/1997 | Schneider | B60B 9/24 |
| | | | 295/33 |
| 5,894,621 A | 4/1999 | Kubo | |
| 6,860,346 B2 | 3/2005 | Burt | |
| 7,503,567 B2 | 3/2009 | Frankie | |
| 7,568,536 B2 | 8/2009 | Yu | |
| 7,594,527 B2 | 9/2009 | Thompson | |
| 7,730,978 B2 | 6/2010 | Dixon | |
| 8,814,626 B2 | 8/2014 | Smith | |
| 9,073,587 B2 | 7/2015 | Kim | |
| 9,168,786 B2 | 10/2015 | Schlee | |
| 9,616,707 B2 * | 4/2017 | Jochim | B60B 19/003 |
| 9,757,978 B1 | 9/2017 | Emigh | |
| 9,878,576 B2 | 1/2018 | Hein | |
| 9,950,567 B2 | 4/2018 | Pfrenger | |
| 2003/0037410 A1 * | 2/2003 | Yamaguchi | B60B 19/003 |
| | | | 16/48 |
| 2010/0141018 A1 * | 6/2010 | McCue | B60B 11/02 |
| | | | 301/5.1 |
| 2010/0187779 A1 * | 7/2010 | Potter | B60B 19/003 |
| | | | 280/5.514 |
| 2010/0224427 A1 * | 9/2010 | Nuchter | B25J 5/007 |
| | | | 180/7.1 |
| 2013/0167991 A1 | 7/2013 | Donohue | |
| 2014/0117637 A1 | 5/2014 | Solheim | |
| 2014/0252844 A1 | 9/2014 | Riwan | |
| 2015/0151572 A1 * | 6/2015 | Parrott | B60B 19/12 |
| | | | 301/5.23 |
| 2015/0165498 A1 | 7/2015 | Kim | |
| 2016/0193877 A1 | 7/2016 | Jang | |
| 2017/0349003 A1 | 12/2017 | Joso | |
| 2018/0020894 A1 | 1/2018 | Sauer | |
| 2018/0022148 A1 | 1/2018 | Lin | |
| 2018/0126779 A1 * | 5/2018 | Brandl | B60B 19/003 |

* cited by examiner

EXPANDABLE WHEEL

CROSS-REFERENCE TO RELATED APPLICATIONS

This application claims the benefit of provisional patent application Ser. No. 62/302,920 filed Mar. 3, 2016 by the present inventor and provisional patent application Ser. No. 62/342,987 filed May 29, 2016 by the present inventor.

FIELD OF INVENTION

The present invention relates in general to wheels and turning mechanisms.

BACKGROUND

Wheels are used abundantly for moving items across various surfaces. In some cases, it may be beneficial to use wheels of different sizes for different purposes. Larger wheels may allow a device to drive over obstacles of greater size. Smaller wheels may be more effective for manoeuvring in tight spaces. However, frequently changing wheels on a device may be prohibitively inconvenient, time-consuming, and expensive. A need exists for a wheel that can be expanded or contracted to serve a variety of purposes.

SUMMARY

It is a goal of the present invention to provide a wheel that can be easily expanded or contracted at any time.

The aforementioned goal is achieved through a wheel, the circumference of which is made up of a series of rollers that are moved radially inward or outward in order to change the size (circumference) of the wheel. The rollers are mounted on linkages, which are connected to spokes. The spokes are connected at a first end to a plate positioned within a main housing of the wheel. When the plate is rotated, the spokes are moved. When the spokes are parallel to the radii of the plate, the connected linkages and rollers are pushed radially outward from the main housing and the wheel is in its most expanded position. When the spokes are as near perpendicular as possible (based on the physical allowance of the particular embodiment) with respect to the radii of the plate, the connected linkages and rollers are pulled radially inward toward the main housing and the wheel is in its most contracted position.

DETAILED DESCRIPTION OF THE INVENTION

The present invention proposes a wheel with an expandable circumference.

Figure 1:
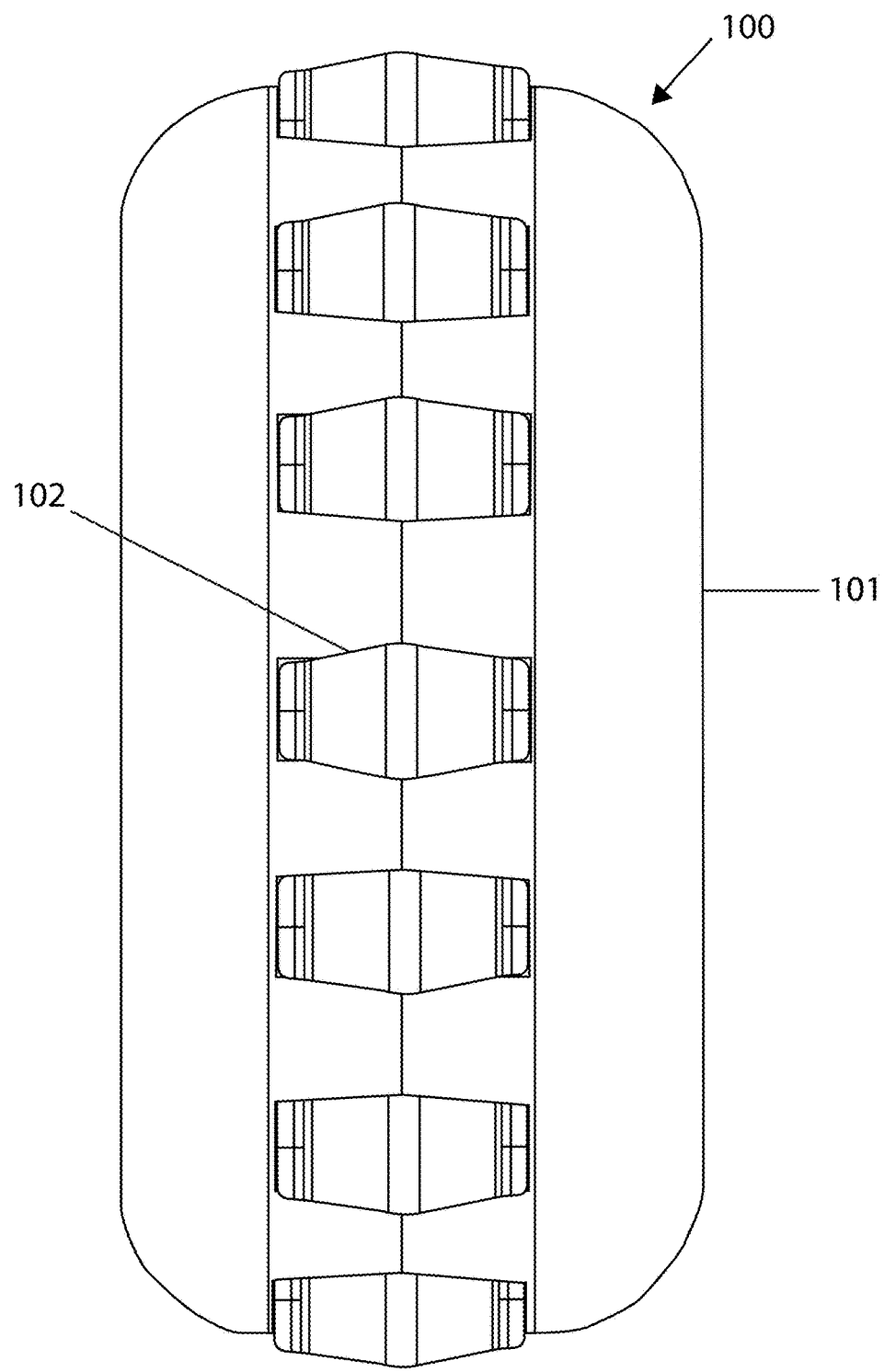
FIG. 1 illustrates a front elevation view of an expandable wheel in a contracted position embodying features of the present invention.

Referring to FIG. 1, a front elevation view of one embodiment of an expandable wheel 100 is illustrated in a contracted position. The main housing 101 of the wheel remains in a fixed position while a plurality of rollers 102 disposed around the circumference of the wheel may be pushed outward radially from the center of the wheel to increase the circumference of the wheel.

Figure 2:
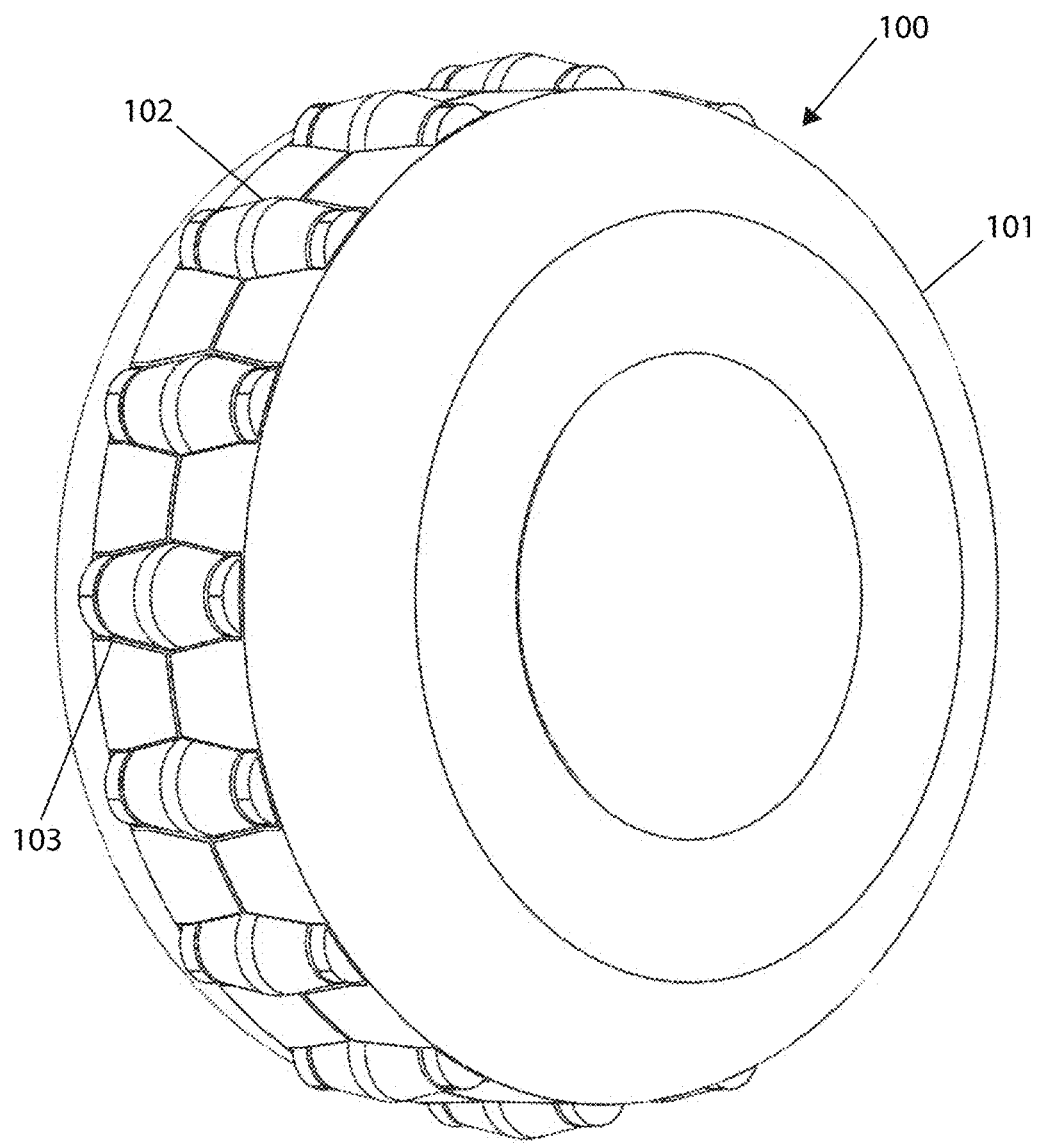
FIG. 2 illustrates a perspective view of an expandable wheel in a contracted position embodying features of the present invention.

Referring to FIG. 2, a perspective view of expandable wheel 100 is illustrated in a contracted position. As can be seen, each roller 102 protrudes slightly through an aperture 103. Again, the main housing 101 of the wheel remains fixed when the rollers are pushed outward through the apertures to create a larger wheel circumference.

Figure 3:
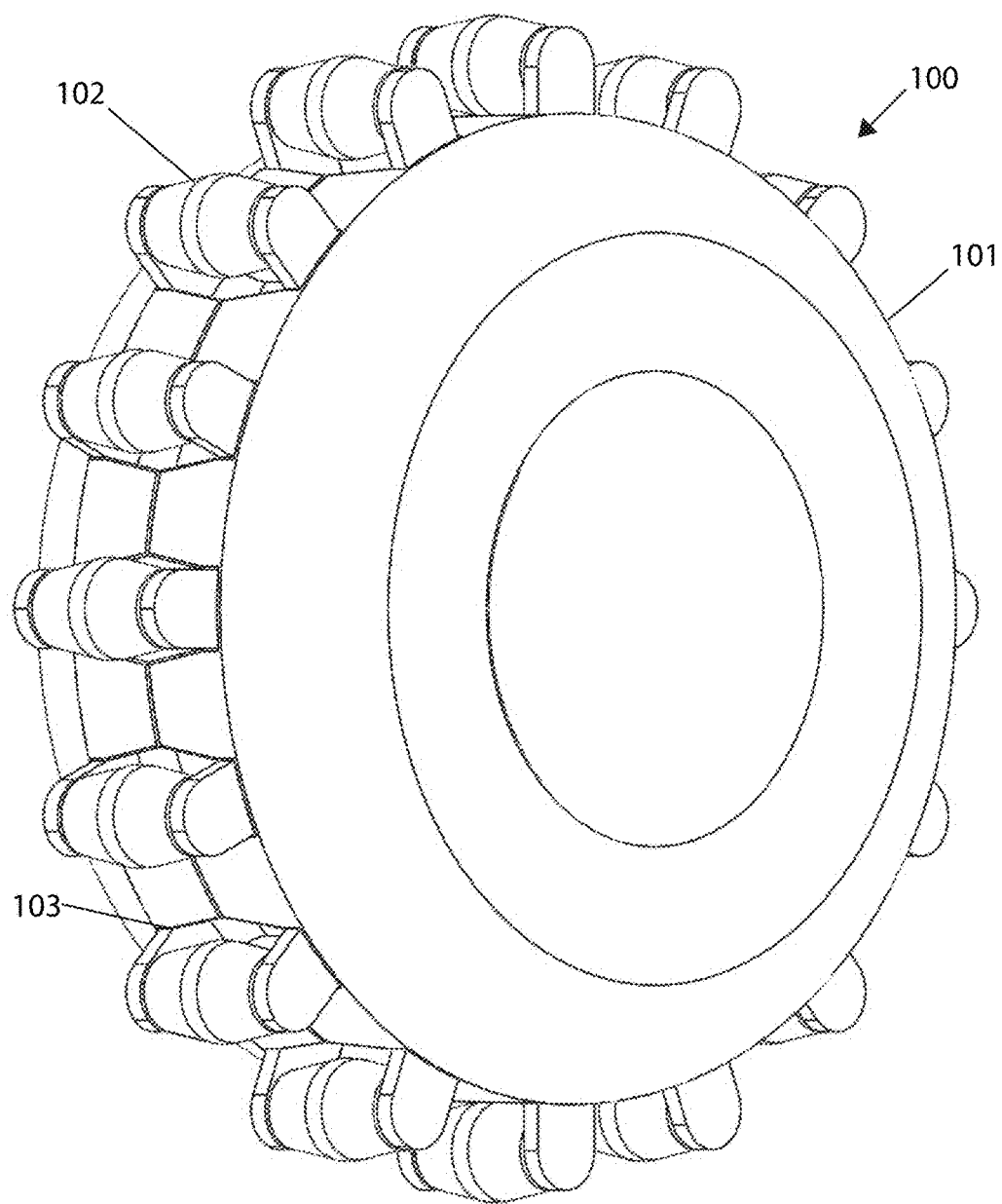
FIG. 3 illustrates a perspective view of an expandable wheel in an expanded position embodying features of the present invention.

Referring to FIG. 3, expandable wheel 100 is illustrated in an expanded position. As can be seen, the main housing 101 of the wheel has remained in a fixed position in relation to the rollers 102, which have been pushed radially outward from the center of the wheel through the apertures 103 via spokes within the wheel (not shown). Each roller is mounted at the end of a pivoting link member, each attached to a spoke so as to be rotatable around an axis of the roller.

Figure 4:
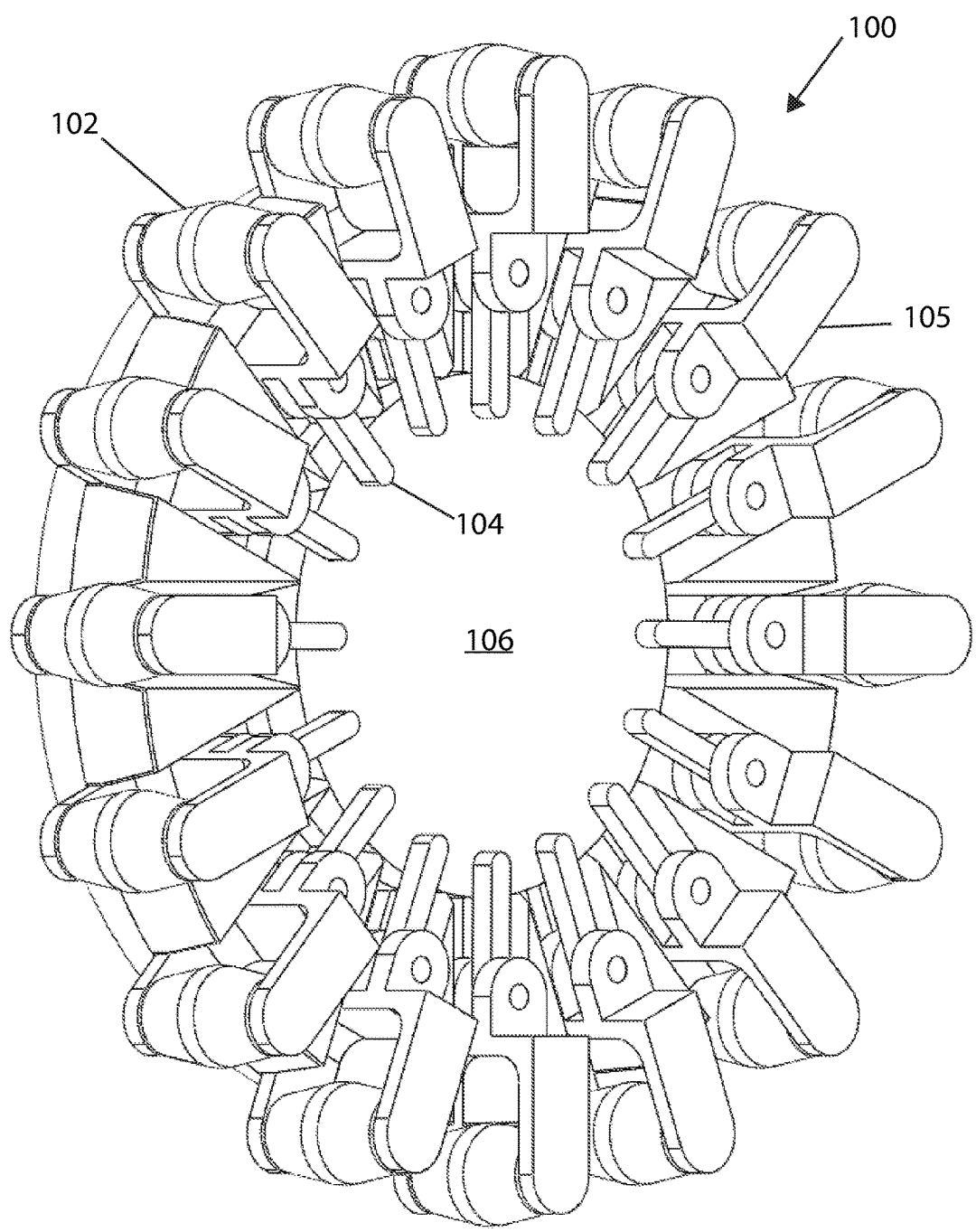
FIG. 4 illustrates a perspective view of a cutaway of an expandable wheel in an expanded position embodying features of the present invention.

Referring to FIG. 4, a cutaway of the wheel 100 is illustrated to show the interior parts. Each roller 102 is mounted on the end of a pivoting linkage 105 connected to a spoke 104. The inner ends of the spokes are connected to a plate 106. The plate 106 positioned within the main housing is rotated relative to the main housing to push the spokes in or out. In the preferred embodiment, the rollers are rotatable around an axis of the rollers.

Figure 5A:
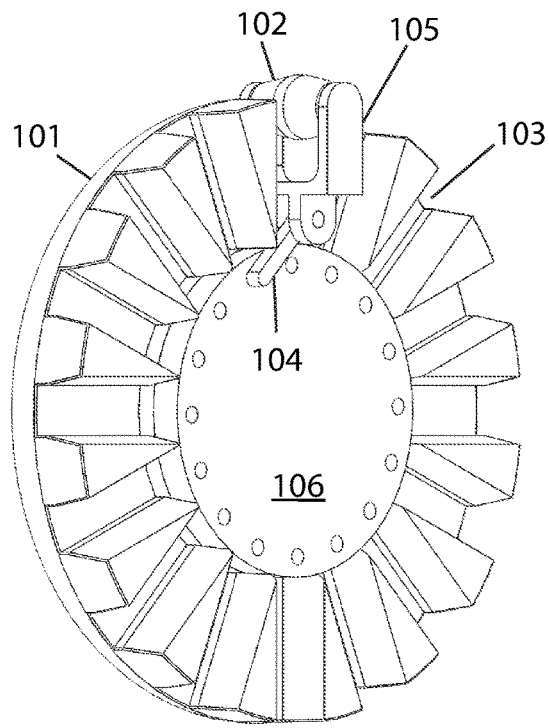
FIG. 5A illustrates a cutaway of an expandable wheel in a contracted position embodying features of the present invention.
Figure 5B:
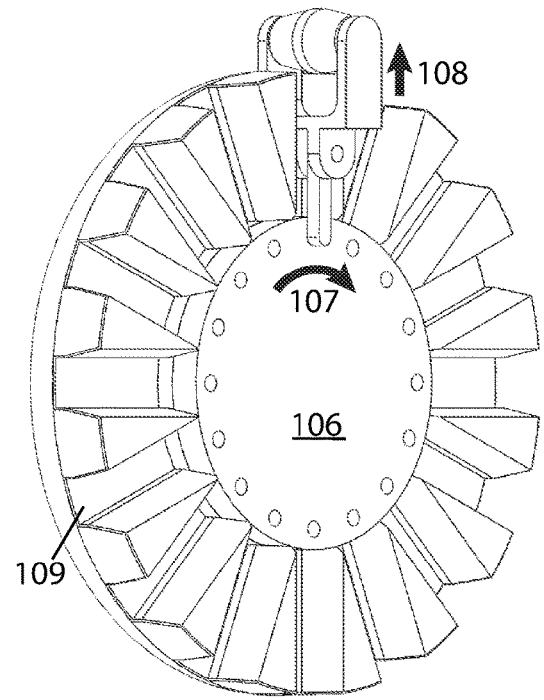
FIG. 5B illustrates a cutaway of an expandable wheel in an expanded position embodying features of the present invention.

Referring briefly to both FIGS. 5A and 5B, additional cutaway views of the wheel are illustrated to more clearly portray the internal parts. In both drawings, a singular spoke, linkage, and roller is illustrated in order to portray the parts more clearly, however, in practice, each of the apertures 103 would contain a spoke, linkage and roller, wherein a set of spokes, linkages, and rollers are distributed radially around a plate 106 to which a first end of each of the spokes are attached. Referring to FIG. 5A, the spoke 104, linkage 105 and roller 102 are in a contracted position. The spoke 104 is mounted pivotally by a first end to a plate 106, which is positioned within a cavity at the center of the main housing 101 fit to the plate 106. Plate 106 is held in place by the two sides of the main housing 101 illustrated in FIGS. 1 and 2. Rotation of plate 106 causes the spokes together with the pivoting linkages to work as a crank mechanism and translate the relative rotation of the two parts to a linear movement of the roller outward from the center of the wheel, the aperture working as a guide. As shown in FIG. 5B, this movement results in each spoke, linkage, and roller group to be extended in a radially outward direction 108. When the plate 106 is rotated in direction 107 and goes from the position shown in FIG. 5A to the position shown in FIG. 5B wherein each spoke is parallel with the corresponding aperture, the spokes and linkages are pushed outward, causing the rollers to protrude further through the apertures. In some embodiments, sleeve 109 is provided to fit around the apertures to limit the wear of the interacting components. Different types of sleeves may be used. The sleeve may be one piece or several separate pieces used to cover around the apertures.

Figure 6:
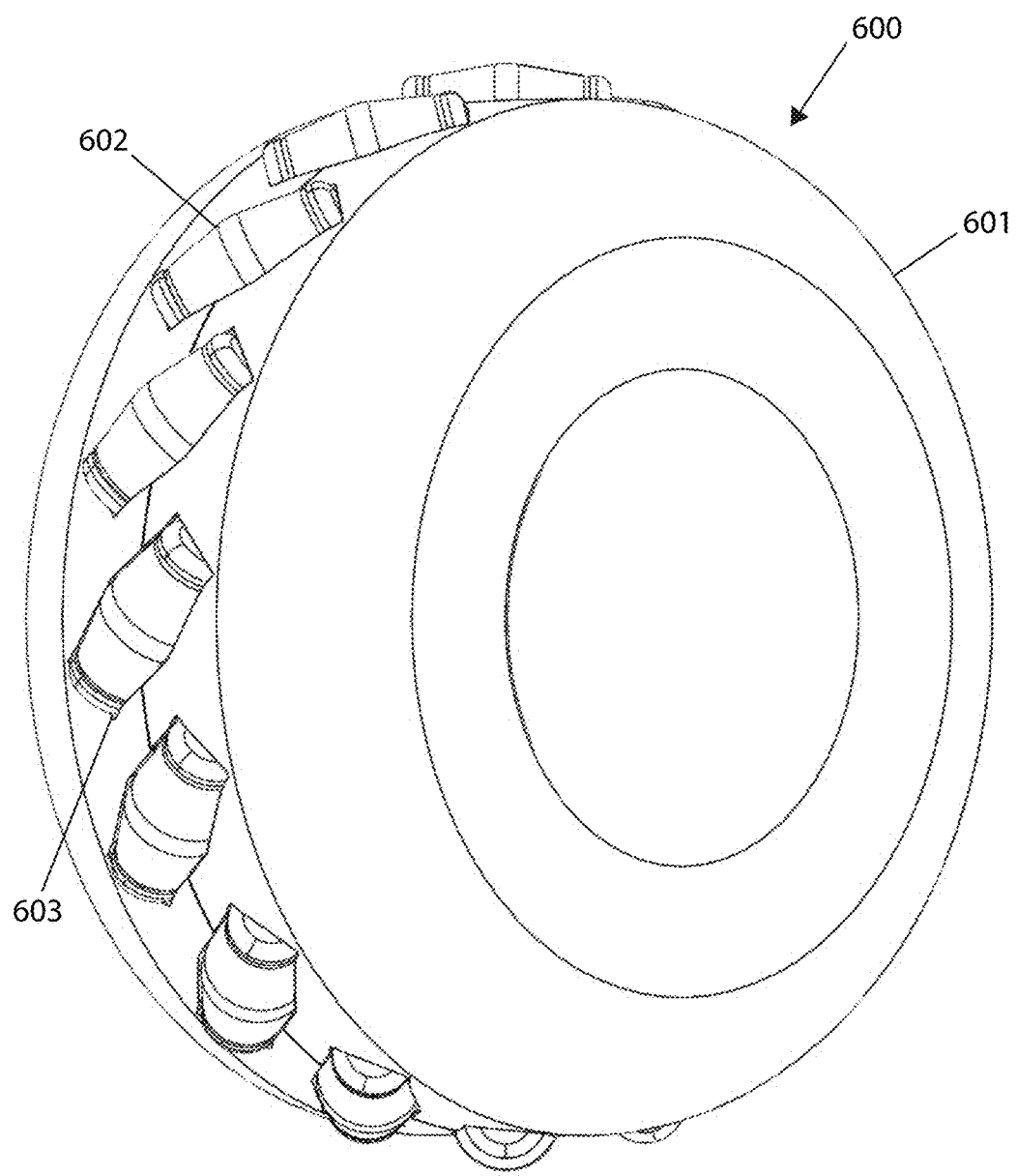
FIG. 6 illustrates a perspective view of an expandable wheel with angled rollers in a contracted position embodying features of the present invention.

In some embodiments, the rollers may be positioned with an axis of rotation at approximately 45° to the plane of the wheel and at approximately 45" to a line through the center of the roller parallel to the axis of rotation of the wheel, similar to mecanum wheels. Referring to FIG. 6, a perspective view of wheel 600 with rollers 602 arranged in this manner is illustrated in a contracted position. As before, the rollers 602 protrude slightly from apertures 603 in main housing 601.

Figure 7:
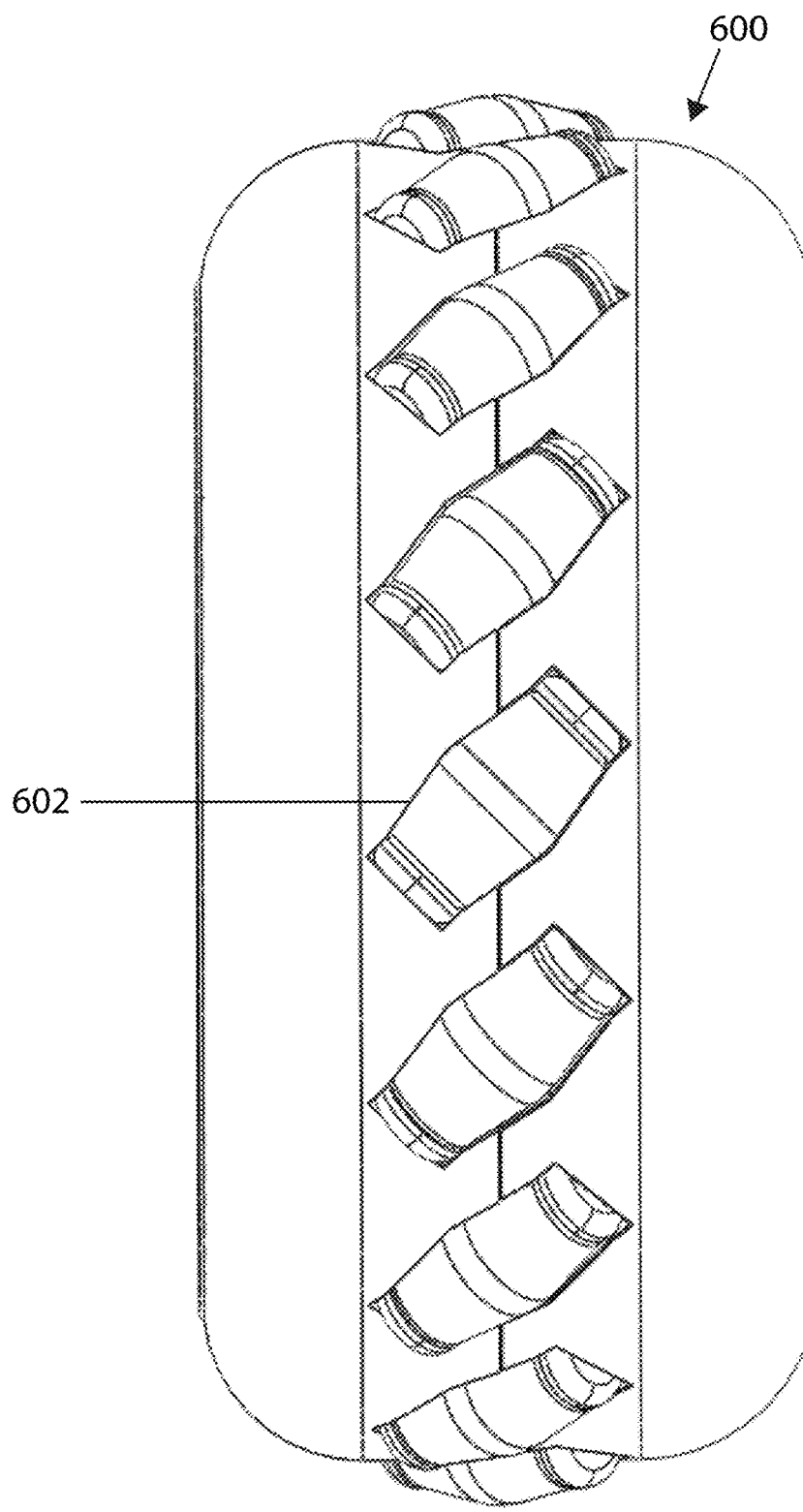
FIG. 7 illustrates a front elevation view of an expandable wheel with angled rollers in a contracted position embodying features of the present invention.

Referring to FIG. 7, a front elevation view of wheel 600 with rollers 602 disposed at approximately 45° to a line through the center of the roller parallel to the axis of rotation of the wheel is illustrated.

Figure 8:
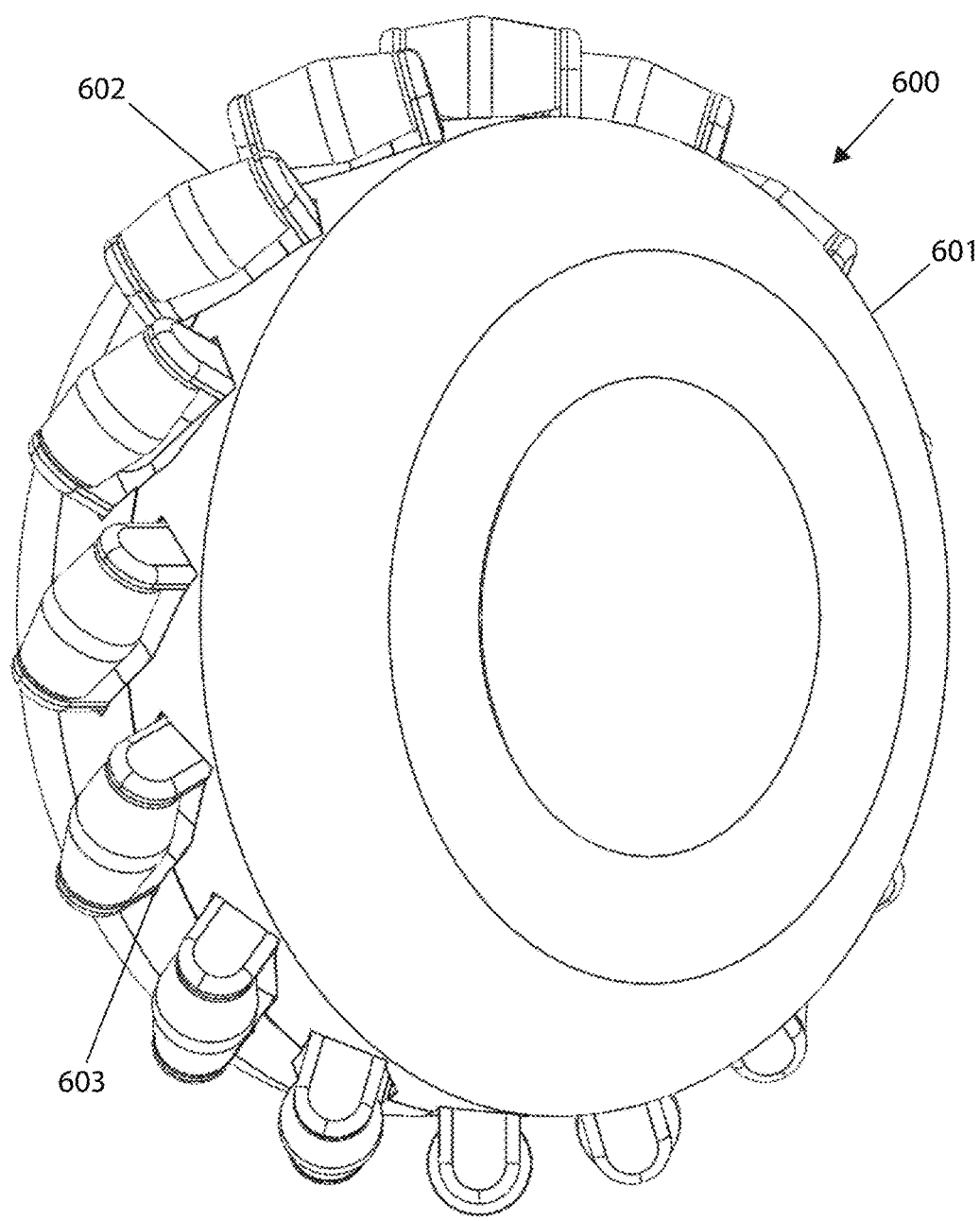
FIG. 8 illustrates a perspective view of an expandable wheel with angled rollers in an expanded position embodying features of the present invention.

Referring to FIG. 8, a perspective view of wheel 600 with rollers 602 disposed as described above is illustrated in an expanded position. As can be seen, the rollers are pushed through the apertures 603 radially outward from the main housing 601.

Figure 9:
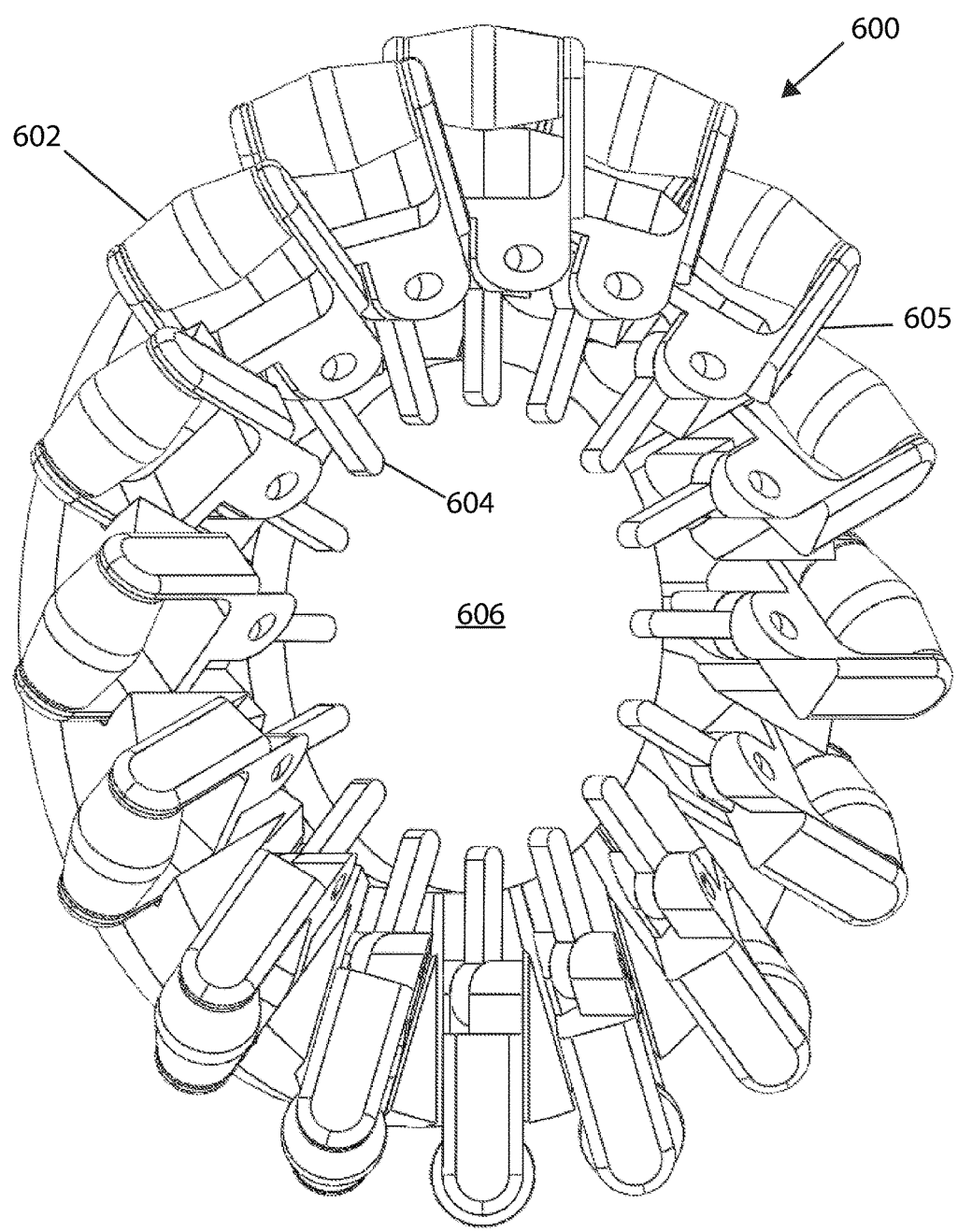
FIG. 9 illustrates a perspective view of a cutaway of an expandable wheel with angled rollers in an expanded position embodying features of the present invention.

Referring to FIG. 9, a cutaway of the wheel 600 with angled rollers is illustrated to show the interior parts of the wheel. In a like manner as previously described, each roller 602 is mounted on the end of a pivoting linkage 605 that is connected to a spoke 604. The inner ends of the spokes are connected to plate 606. The plate 606 positioned within the main housing is rotated relative to the main housing to push the spokes in or out. In the preferred embodiment, the rollers are rotatable around an axis of the rollers.

Figure 10A:
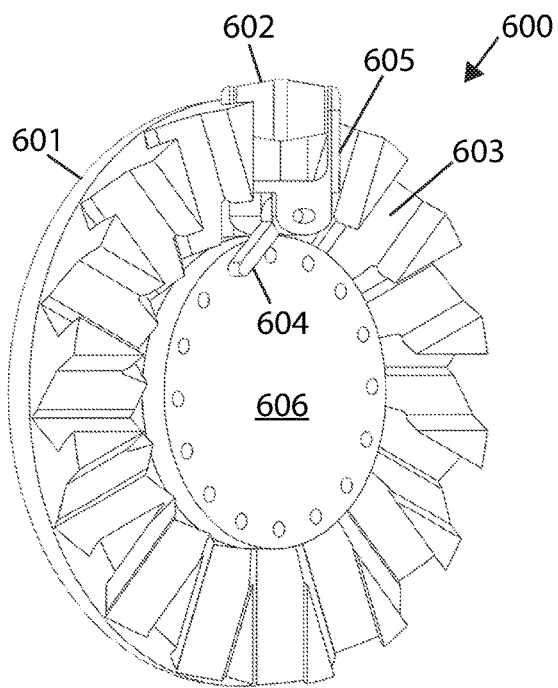
FIG. 10A illustrates a cutaway of an expandable wheel with angled rollers in a contracted position embodying features of the present invention.
Figure 10B:
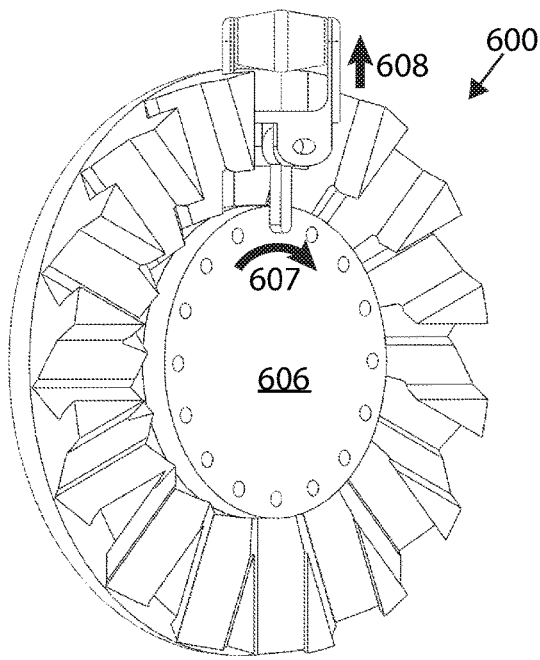
FIG. 10B illustrates a cutaway of an expandable wheel with angled rollers in an expanded position embodying features of the present invention.

Referring briefly to both FIGS. 10A and 10B, cutaway views of the wheel 600 are illustrated to more clearly portray the internal parts. In both drawings, a singular spoke, linkage, and roller is illustrated in order to portray the parts more clearly, however, in practice, for each aperture 603, there would be a corresponding spoke, linkage and roller. Referring to FIG. 10A, the spoke 604, linkage 605 and roller 602 are in a contracted position. The spoke 604 is mounted pivotally by a first end to plate 606, which is positioned within a cavity at the center of the main housing 601 fit to the plate 606. Plate 606 is held in place by the two sides of the main housing 601 illustrated in FIGS. 7 and 8. Rotation of plate 606 causes the spokes together with the pivoting linkages to work as a crank mechanism and translate the relative rotation of the two parts to a linear movement of the roller outward from the center of the wheel, the aperture working as a guide. As shown in FIG. 10B, this movement results in each spoke, linkage, and roller group to be extended in a radially outward direction 608. When the plate 606 is rotated in a direction 607, until a point where each spoke is parallel with the corresponding aperture, the spoke and linkage are pushed, causing the roller to protrude further out from the aperture.

Figure 11:
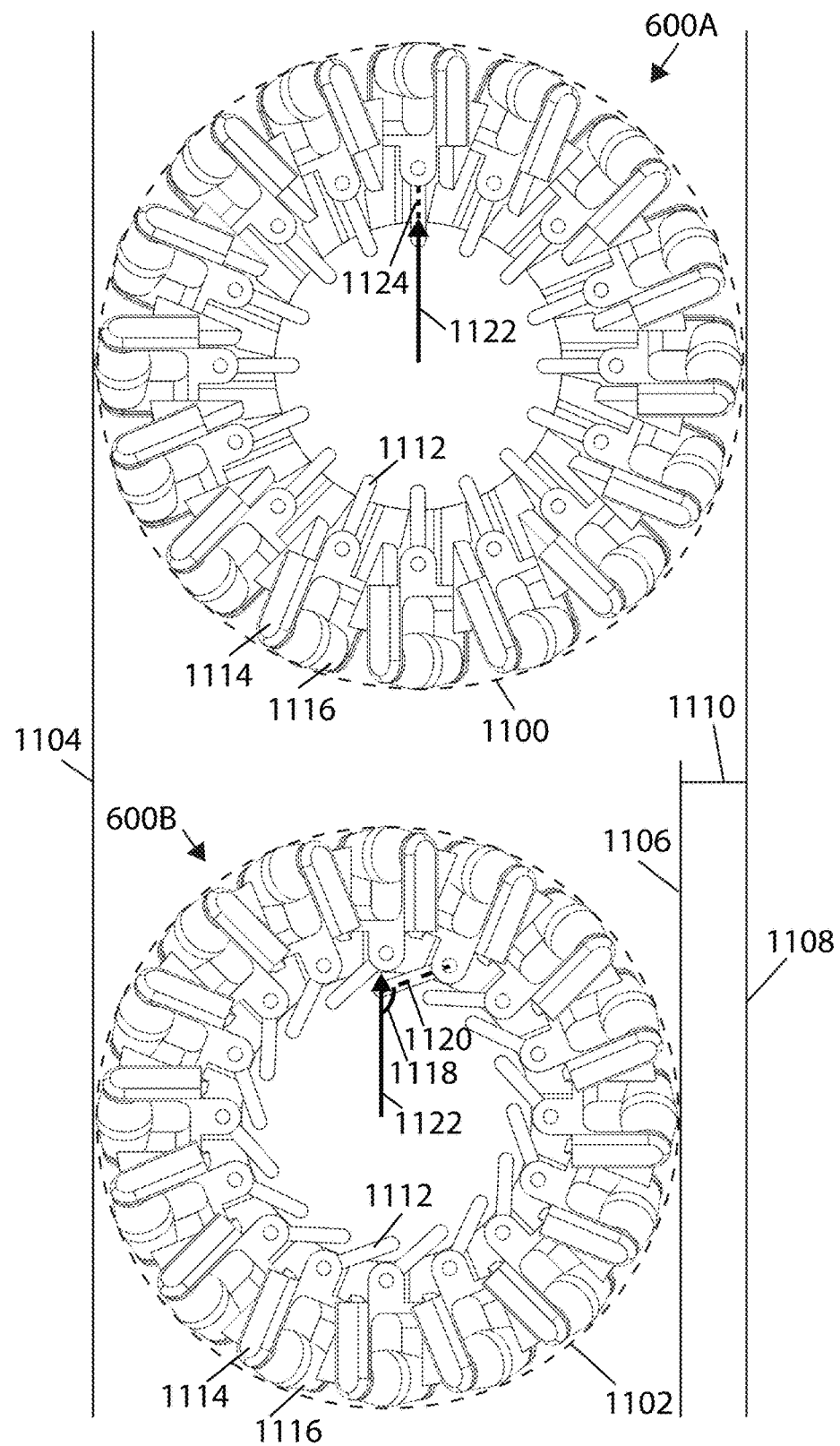
FIG. 11 illustrates the difference in circumference between an expandable wheel in an expanded position and a contracted position embodying features of the present invention.

Referring to FIG. 11, a side elevation view of a wheel with rollers angled as described above is illustrated in an expanded position (600A) and in a contracted position (600B). Lines 1104, 1106 and 1108 are provided for reference. As can be seen, the circumference 1100 of the wheel in the expanded position is greater than the circumference 1102 of the wheel in the contracted position. The diameter of wheel 600A extends from line 1104 to line 1108, a distance 1110 further than the diameter of wheel 600B, which extends from line 1104 to line 1106. In embodiments, spokes 1112, linkages 1114, and rollers 1116 may be maintained at any position between a first contracted position, such as the contracted position of wheel 600B, and a second expanded position, such as the expanded position of wheel 600A. In embodiments wherein spokes 1112, linkages 1114 and rollers 1116 are positioned in the first contracted position (wheel 600B) spokes 1112 are as close to perpendicular as possible (based on the physical allowance of the particular embodiment) with respect to a radius of the inner shaft plate. For example, angle 1118 of centerline 1120 of a spoke of wheel 600B is as close to perpendicular with respect to radius 1122 of the inner shaft of wheel 600B when linkages 1114 and rollers 1116 are pulled by the spokes as closely as possible to the inner shaft. In embodiments wherein spokes 1112, linkages 1114 and rollers 1116 are positioned to the second expanded position (wheel 600A), spokes 112 are parallel to the radius of the inner shaft. For example, centerline 1124 of a spoke of wheel 600A is as close to parallel with respect to radius 1122 of the inner shaft of wheel 600A when linkages 1114 and rollers 1116 are pushed as far outward from the inner shaft. The radius line may be a line extending from the center of the inner shaft and passing through the point of attachment between the particular spoke and inner shaft.

In some embodiments, the wheel has between 10 and 20 apertures, spokes, linkages, and rollers.

The invention claimed is:

1. An expandable wheel comprised of:
 a main housing with a series of apertures disposed radially thereabout;
 a plate disposed within a cavity of the main housing;
 a set of spokes distributed radially around the plate and attached thereto at a first end, each spoke positioned within one of the series of apertures in the main housing;
 a set of linkages distributed radially around the plate and attached to a second end of the spokes, the linkages positioned within the apertures;
 a set of rollers distributed radially around the plate and mounted on the linkages;
 wherein the spokes, linkages and rollers can be moved from a first, contracted position in which the spokes, linkages, and rollers are pulled by the spokes towards the main housing, to a second, expanded position, in which the spokes, linkages, and rollers are pushed outward from the main housing by clockwise or counter clockwise rotation of the plate relative to the main housing.

2. The expandable wheel of claim 1 wherein the rollers are positioned with an axis of rotation at approximately 45 degrees to a plane of the wheel and at approximately 45 degrees to a line through a center of the roller parallel to an axis of rotation of the wheel.

3. The expandable wheel of claim 1 wherein a sleeve is provided around each aperature.

4. The expandable wheel of claim 1 wherein the expandable wheel has between 10 and 20 apertures, spokes, linkages, and rollers.

5. A wheel with an expandable circumference comprising:
a main housing with a series of apertures disposed radially thereabout;
a plate disposed within a cavity of the main housing;
a set of spokes distributed radially around the plate and attached thereto at a first end, each spoke positioned within one of the series of apertures in the main housing;
a set of linkages distributed radially around the plate and attached to a second end of the spokes, the linkages positioned within the apertures;
a set of rollers distributed radially around the plate mounted on the linkages, the rollers forming a circumference of the wheel;
wherein the spokes, linkages and rollers can be moved from a first, contracted position in which the spokes are as close to perpendicular as can be accommodated with respect to a radius of the plate and the linkages and rollers are pulled by the spokes to a minimum distance from the plate, to a second, expanded position, in which the spokes are substantially parallel to a radius of the plate and the linkages and rollers are pushed to a maximum distance from the plate by clockwise or counter clockwise rotation of the plate relative to the main housing.

6. The wheel of claim 5 wherein the rollers are positioned with an axis of rotation at approximately 45 degrees to a plane of the wheel and at approximately 45 degrees to a line through a center of the roller parallel to an axis of rotation of the wheel.

7. The wheel of claim 5 wherein a sleeve is provided around each aperture.

8. The wheel of claim 5 wherein the wheel has between 10 and 20 apertures, spokes, linkages, and rollers.

* * * * *